United States Patent
Deng (10) Patent No.: US 11,223,436 B2
(45) Date of Patent: Jan. 11, 2022

(54) METHODS AND DEVICES FOR DETERMINING AN AVAILABILITY OF A SYNCHRONIZATION SOURCE

(71) Applicant: Telefonaktiebolaget LM Ericsson (publ), Stockholm (SE)

(72) Inventor: Cuihua Deng, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 31 days.

(21) Appl. No.: 16/761,645

(22) PCT Filed: Nov. 27, 2017

(86) PCT No.: PCT/CN2017/113071
§ 371 (c)(1),
(2) Date: May 5, 2020

(87) PCT Pub. No.: WO2019/100370
PCT Pub. Date: May 31, 2019

(65) Prior Publication Data
US 2021/0175990 A1    Jun. 10, 2021

(51) Int. Cl.
*H04J 3/06* (2006.01)
*H04J 3/12* (2006.01)
*H04J 3/14* (2006.01)

(52) U.S. Cl.
CPC .......... *H04J 3/0641* (2013.01); *H04J 3/0608* (2013.01); *H04J 3/12* (2013.01); *H04J 3/14* (2013.01)

(58) Field of Classification Search
None
See application file for complete search history.

(56) References Cited

U.S. PATENT DOCUMENTS

| 6,560,245 B1* | 5/2003 | Slater .................... H04J 3/0641 370/537 |
| 7,916,820 B2 | 3/2011 | Cranford, Jr. et al. |
| 9,762,340 B1 | 9/2017 | Derrico |
| 2008/0205294 A1* | 8/2008 | Brune .................... H04J 3/0641 370/254 |
| 2011/0142077 A1 | 6/2011 | Wong et al. |

OTHER PUBLICATIONS

Communication Regarding European Search Report and Opinion for European Patent Application No. 17933180.6 dated Nov. 4, 2020.
International Search Report and Written Opinion of the International Searching Authority for PCT International Application No. PCT/CN2017/113071 dated May 30, 2018.

(Continued)

*Primary Examiner* — Alpus Hsu
(74) *Attorney, Agent, or Firm* — Sage Patent Group (57) ABSTRACT

The present disclosure relates to a method for determining an availability of a synchronization source in a communication system. The method comprises: detecting a stability of the synchronization source when the synchronization source recovers from a failure; and determining the availability of a synchronization source based on the detected stability of the synchronization source. The present disclosure also relates to network devices and a computer readable medium for performing said method.

16 Claims, 4 Drawing Sheets

(56) References Cited

OTHER PUBLICATIONS

European Telecommunications Standards Institute (ETSI), "Transmission and Multiplexing (TM); Generic requirements of transport functionality of equipment; Part 6-1: Synchronization layer functions," EIS 300 417-6-1, Aug. 1998, 101 pgs (pp. 19-21 mentioned in ISR).

ITU-T, "Synchronization layer functions," Series G: Transmission Systems and Media, Digital Systems and Networks. Digital terminal equipments—Principal characteristics of multiplexing equipment for the synchronous digital hierarchy, G.781, Sep. 2008, 124 pgs.

ITU-T, "Precision time protocol telecom profile for frequency synchronization," Series G: Transmission Systems and Media, Digital Systems and Networks. Packet over Transport aspects—Synchronization, quality and availability targets. Series Y: Global Information Infrastructure, Internet Protocol Aspects and Next-Generation Networks. Internet protocol aspects—Transport, G.8265.1/Y.1365.1, Jul. 2014, 32 pgs.

\* cited by examiner

METHODS AND DEVICES FOR DETERMINING AN AVAILABILITY OF A SYNCHRONIZATION SOURCE

CROSS REFERENCE TO RELATED APPLICATION

This application is a 35 U.S.C. § 371 national stage application of PCT International Application No. PCT/CN2017/113071, filed on Nov. 27, 2017, the disclosure and content of which is incorporated herein by reference in its entirety.

TECHNICAL FIELD

This disclosure generally relates to a communication system, and in particular to methods and device for determining an availability of a synchronization source in a communication system.

BACKGROUND

Various components or devices operating in a communication system typically require a synchronization between them due to a demand of cooperation. Thus, the communication system typically provides those components or devices with several synchronization source candidates so that those components or devices may select one of synchronization source candidates as a reference.

A synchronization source might fail due to many factors. If selected synchronization source fails, another one of synchronization source candidates may be selected as the reference. In this case, even if the failing synchronization source recovers from the failure condition, it may not be considered an available candidate for those components or devices that select synchronization source candidate because the synchronization source might experience a failure again.

SUMMARY

The summary is provided to introduce a selection of concepts in a simplified form that are further described below in detailed description. This summary is not intended to identify key features or essential features of the claimed subject matter, nor is it intended to be used to limit the scope of the claimed subject matter.

To avoid a ping-pong switching of a synchronization source due to a repeated failure, the wait-to-restore time (WTR) is introduced. The WTR applies when a failing synchronization source recovers from a failure condition to observe whether the synchronization source fails again within the WTR. If the synchronization source does not fail again when the WTR expires, the synchronization source may be considered an available candidate again. Thus, the introduction of the WTR may ensure that a previous failed synchronization source is fault-free for a certain time (i.e., the WTR).

However, the WTR is fixed and cannot be adjusted, especially cannot be adjusted automatically once it is configured. Thus, the manner of the WTR lacks flexibility and might waste time if the WTR is too long. Besides, the WTR cannot handle an instable state for a synchronization source that is referred to as flap. The flap means that a synchronization source changes from a traceable state to a failing state, and then a traceable state again during a period. The WTR also cannot differentiate between a synchronization source in which flap occurs frequently and a synchronization source in which flap occurs less frequently. Hence, there is a need for a solution addressing the above issues.

In general, embodiments of the present disclosure provide a solution for solving the issues of synchronization source as discussed above.

According to a first aspect of the present disclosure, a method for determining an availability of a synchronization source in a communication system is provided. The method may comprise detecting a stability of the synchronization source when the synchronization source recovers from a failure; and determining the availability of a synchronization source based on the detected stability of the synchronization source.

According to one or more embodiments of the first aspect of the present disclosure, the detecting the stability of the synchronization source when the synchronization source recovers from the failure may comprise: starting a first period when the synchronization source recovers from the failure; detecting within the first period whether there is the flap occurred in the synchronization source; identifying the synchronization source as instable if the flap is detected in the synchronization source; or identifying the synchronization source as stable if no flap is detected in the synchronization source.

According to one or more embodiments of the first aspect of the present disclosure, identifying the synchronization source as instable further may comprise: setting a penalty value and a count for the flap detected in the synchronization source; increasing the penalty value and the count; starting a second period; detecting within the second period whether there is another failure in the synchronization source; restarting the first period when the synchronization source recovers from the another failure if the another failure is detected in the synchronization source; or decreasing the penalty value if no another failure is detected in the synchronization source; comparing decreased penalty value with a threshold; if the decreased penalty value is larger than or equal to the threshold: identifying the synchronization source as instable; restarting the second period; or if the decreased penalty value is less than the threshold: identifying the synchronization source as stable.

According to one or more embodiments of the first aspect of the present disclosure, determining the availability of the synchronization source based on the detected stability of the synchronization source may further comprise: determining the synchronization source as available if the synchronization source is identified as stable; or determining the synchronization source as unavailable if the synchronization source is identified as instable.

According to one or more embodiments of the first aspect of the present disclosure, determining the availability of a synchronization source based on the detected stability of the synchronization source may further comprise: determining the synchronization source as available even if the synchronization source is identified as instable in the case that the synchronization source is used originally and/or the penalty value of the synchronization source is the smallest among all synchronization sources if all synchronization sources are identified as instable.

According to one or more embodiments of the first aspect of the present disclosure, the method may further comprise generating an alarm when the synchronization source is determined as available.

According to one or more embodiments of the first aspect of the present disclosure, the penalty value, the count, the threshold, the first period, and the second period may be configurable.

According to one or more embodiments of the first aspect of the present disclosure, initial values of the penalty value and the count may be configured to be zero.

According to one or more embodiments of the first aspect of the present disclosure, the method may further comprise configuring a maximum value of the penalty value such that the penalty value does not continue to increase when the penalty value reaches the maximum value.

According to one or more embodiments of the first aspect of the present disclosure, the penalty value may be based on the count.

According to one or more embodiments of the first aspect of the present disclosure, decreasing the penalty value may comprise decreasing penalty value faster than increasing the penalty value.

According to one or more embodiments of the first aspect of the present disclosure, decreasing penalty value faster than increasing the penalty value may comprise decreasing the penalty value exponentially.

According to a second aspect of the present disclosure, a network device for determining an availability of a synchronization source in a communication system is provided. The network device may comprise: a processor; and a memory communicatively coupled to the processor and adapted to store instructions which, when executed by the processor, cause the network device to perform operations of: detecting a stability of the synchronization source when the synchronization source recovers from a failure; and determining the availability of a synchronization source based on the detected stability of the synchronization source.

According to one or more embodiments of the second aspect of the present disclosure, the operation of detecting the stability of the synchronization source when the synchronization source recovers from a failure may comprise operations of: starting a first period when the synchronization source recovers from the failure; detecting within the first period whether there is the flap occurred in the synchronization source; identifying the synchronization source as instable if the flap is detected in the synchronization source; or identifying the synchronization source as stable if no flap is detected in the synchronization source.

According to one or more embodiments of the second aspect of the present disclosure, the operation of identifying the synchronization source as instable may further comprise operations of: setting a penalty value and a count for the flap detected in the synchronization source; increasing the penalty value and the count; starting a second period; detecting within the second period whether there is another failure in the synchronization source; restarting the first period when the synchronization source recovers from the another failure if the another failure is detected in the synchronization source; or decreasing the penalty value if no another failure is detected in the synchronization source; comparing decreased penalty value with a threshold; if the decreased penalty value is larger than or equal to the threshold: identifying the synchronization source as instable; restarting the second period; or if the decreased penalty value is less than the threshold: identifying the synchronization source as stable.

According to one or more embodiments of the second aspect of the present disclosure, the operation of determining the availability of the synchronization source based on the detected stability of the synchronization source may further comprise operations of: determining the synchronization source as available if the synchronization source is identified as stable; or determining the synchronization source as unavailable if the synchronization source is identified as instable.

According to one or more embodiments of the second aspect of the present disclosure, the operation of determining the availability of a synchronization source based on the detected stability of the synchronization source may further comprise operations of: determining the synchronization source as available even if the synchronization source is identified as instable in the case that the synchronization source is used originally and/or the penalty value of the synchronization source is the smallest among all synchronization sources if all synchronization sources are identified as instable.

According to one or more embodiments of the second aspect of the present disclosure, the network device may further comprise an operation of generating an alarm when the synchronization source is determined as available.

According to one or more embodiments of the second aspect of the present disclosure, wherein the penalty value, the count, the threshold, the first period, and the second period may be configurable.

According to one or more embodiments of the second aspect of the present disclosure, wherein initial values of the penalty value and the count may be configured to be zero.

According to one or more embodiments of the second aspect of the present disclosure, the network device may further comprise an operation of configuring a maximum value of the penalty value such that the penalty value does not continue to increase when the penalty value reaches the maximum value.

According to one or more embodiments of the second aspect of the present disclosure, wherein the penalty value may be based on the count.

According to one or more embodiments of the second aspect of the present disclosure, wherein the operation of decreasing the penalty value may comprise an operation of decreasing penalty value faster than increasing the penalty value.

According to one or more embodiments of the second aspect of the present disclosure, wherein the operation of decreasing penalty value faster than increasing the penalty value may comprise an operation of decreasing the penalty value exponentially.

According to the third aspect of the present disclosure, a non-transitory computer readable medium is provided. The non-transitory computer readable medium has a computer program stored thereon which, when executed by a processor, causes the processor to perform the method according to the first aspect of the present disclosure.

According to embodiments of the present disclosure, the availability of the synchronization source can be determined in a flexible manner and the stability of synchronization source for the components or devices can be enhanced.

BRIEF DESCRIPTION OF THE DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent element. The drawings are illustrated for facilitating better understanding of the embodiments of the disclosure and not necessarily drawn to scale, in which.

DETAILED DESCRIPTION

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment", "an embodiment", "an example embodiment", etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a "first" element could also be referred to as a "second" element, and similarly, a "second" element could also be referred to as a "first" element, without departing from the scope of example embodiments. As used herein, the term "and/or" includes any and all combinations of one or more of the associated listed items.

The terminology used herein is for the purpose of describing particular embodiments only and is not intended to be liming of example embodiments. As used herein, the singular forms "a", "an", and "the" are intended to include the plural forms as well, unless the context clearly indicates otherwise. It will be further understood that the terms "comprises", "comprising", "has", "having", "includes", and/or "including", when used herein, specify the presence of stated features, elements, and/or components etc., but do not preclude the presence or addition of one or more other features, elements, components and/or combinations thereof.

As used herein, the term "communication system" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

The term "network device" refers to a device in a wireless communication network via which a terminal device accesses the network and receives services therefrom. The network device refers a base station (BS), an access point (AP), a Mobile Management Entity (MME), Multi-cell/Multicast Coordination Entity (MCE), a gateway, a server, a controller or any other suitable device in the wireless communication network. The BS may be, for example, a node B (NodeB or NB), an evolved NodeB (eNodeB or eNB), a gNB, a Remote Radio Unit (RRU), a radio header (RH), a remote radio head (RRH), a relay, a low power node such as a femto, a pico, and so forth.

Yet further examples of network device include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network device may represent any suitable device (or group of devices) capable, configured, arranged, and/or operable to enable and/or provide a terminal device access to the wireless communication network or to provide some service to a terminal device that has accessed the wireless communication network.

Wherein, the term "terminal device" refers to any end device that can access a wireless communication network and receive services therefrom. By way of example and not limitation, the terminal device refers to a mobile terminal, UE, or other suitable device. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like. The terminal device may support device-to-device (D2D) communication, for example by implementing a 3GPP standard for sidelink communication, and may in this case be referred to as a D2D communication device.

In the following description and claims, unless defined otherwise, all technical and scientific terms used herein have the same meaning as commonly understood by one of ordinary skills in the art to which this disclosure belongs.

Figure 1:
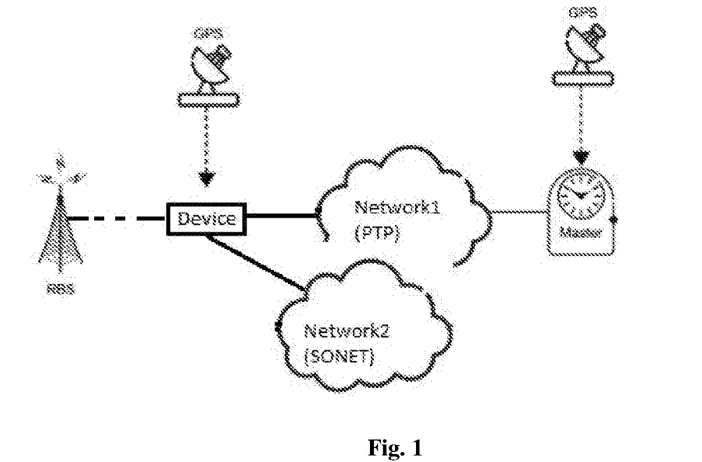
FIG. 1 is a schematic diagram illustrating different types of synchronization sources.

Devices or components in a communication system may be provided with a plurality of different types of synchronization sources. For example, devices or components may be provided with a synchronization source from a Radio Base Station (RBS), a synchronization source from a Global Position System (GPS), a synchronization source from a Precision Time Protocol (PTP) network 1, and a synchronization source from a Synchronous Optical Network (SONET) 2, as shown in FIG. 1. In the case of FIG. 1, the time reference of the PTP network 1 may be from a master clock and the time reference of master clock may be from GPS. That is, the PTP network 1 may either receive a synchronization source or provide a synchronization source. It can be seen in FIG. 1 that there may be a lot of different types of synchronization sources for devices or components in a communication system. It will be appreciated that the synchronization sources for devices or components in a communication system are not limited to those shown in FIG. 1.

Figure 2:
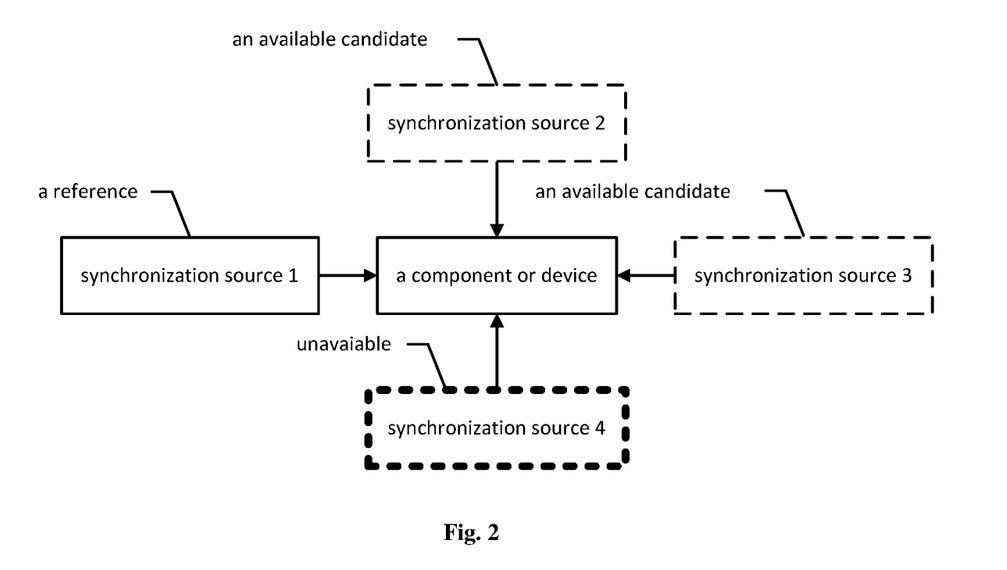
FIG. 2 is a block diagram illustrating different states of synchronization sources.

When devices or components in a communication system are provided with a plurality of different types of synchronization sources, they may select one of those synchronization sources as a reference. As shown in FIG. 2, a device may select the synchronization source 1 as reference among four synchronization sources 1-4. The synchronization source 2 and the synchronization source 3 may be available candidates. However, the synchronization source 4 may be unavailable due to some factors, e.g. failing. That is, those synchronization sources may have different states. If the synchronization source 4 fails repeatedly after a recovery and being a candidate, a ping-pong switching of the synchronization source 4 is possible.

To avoid a ping-pong switching of a synchronization source due to a repeated failure, the wait-to-restore time (WTR) is introduced. The WTR applies when a failing synchronization source recovers from a failure condition to observe whether the synchronization source fails again within the WTR. If the synchronization source does not fail again when the WTR expires, the synchronization source may be considered an available candidate again. Thus, the introduction of the WTR may ensure that a previous failed synchronization source is fault-free for a certain time (i.e., the WTR).

However, the WTR is fixed and cannot be adjusted, especially cannot be adjusted automatically once it is configured. Thus, the manner of the WTR lacks flexibility and might waste time if the WTR is too long. Besides, the WTR cannot handle an instable state for a synchronization source that is referred to as flap. Herein flap means that a synchronization source changes from a traceable state to a failing state, and then a traceable state again during a period. The WTR also cannot differentiate a synchronization source in which flap occurs frequently and a synchronization source in which flap occurs less frequently.

There is hence a need for a solution addressing the issues as discussed above.

Figure 3:
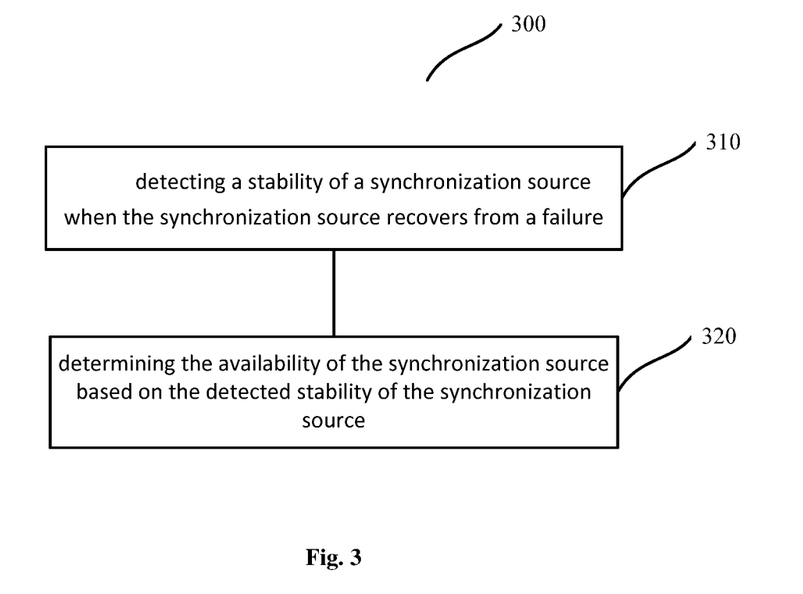
FIG. 3 is a flowchart schematically illustrating a method for determining an availability of a synchronization source in a communication system according to an embodiment of the present disclosure.

FIG. 3 is a flowchart schematically illustrating a method for determining an availability of a synchronization source in a communication system according to an embodiment of the present disclosure. With reference to FIG. 3, in accordance with an embodiment of the present disclosure, a method 300 for determining an availability of a synchronization source in a communication system may comprise detecting a stability of a synchronization source when the synchronization source recovers from a failure at block 310. As stated above, even if a failing synchronization source recovers from a failure condition, it may not be considered an available candidate because the synchronization source might not be stable due to flap. Thus, method 300 may first detect a stability of the synchronization source that recovers from a failure to avoid a ping-pong switching of the synchronization source even though a flap occurs in the synchronization source.

After detecting the stability of the synchronization source, method 300 may determine the availability of a synchronization source based on the detected stability of the synchronization source at block 320. That is, according to method 300, the availability of a synchronization source is based on the detected stability of the synchronization source and thus the availability of a synchronization source may vary dynamically over the change of stability of the synchronization source. Thus, method 300 may determine dynamically the availability of a synchronization source in a flexible manner instead of determining the availability of a synchronization source based on only the status of the synchronization source in a fixed WTR, as described below.

In an exemplary embodiment according to method 300, detecting the stability of the synchronization source when the synchronization source recovers from a failure may comprise starting a period, which could be called a first period, when the synchronization source recovers from the failure to detect within the first period whether there is flap occurred in the synchronization source. Since a flap might occur in the synchronization source once the synchronization source recovers from the failure, it is necessary that detecting whether a flap occurs in the synchronization source in an observation period after the synchronization source recovers from the failure. Thus, the first period should start at a recovery of the synchronization source.

In contrast to the WTR that is fixed once it is configured, the first period according to method 300 may be configurable or adjustable. The configurable or adjustable first period may cause a process of detecting a flap to be shortened, lengthened, or terminated automatically or manually at any time based on a state of the synchronization source and/or a demand. For example, the first period may be shortened in a case that a flap occurs scarcely in the synchronization source according to a history record. That is, when a synchronization source may be considered always stable and trusted according to a history record, the process of detecting a flap, i.e., detecting the stability of the synchronization source, thus can be shortened to save time and improve efficiency. In contrast, the first period may be lengthened in a case that flap occurs frequently in the synchronization source according to history record. That is, when a the synchronization source may be considered always instable and untrusted according to a history record, the process of detecting a flap, i.e., detecting the stability of the synchronization source, thus can be lengthened to ensure that the synchronization source may be a candidate again only if it is really stable. In some embodiments, the first period may be terminated by a human operator in a case that the human operator considers the synchronization source stable. Obviously, a configurable or adjustable first period may deal with various situations of a synchronization source in a more flexible manner.

According to method 300, after a detection of a synchronization source, a stability of the synchronization source may be identified based on the result of the detection. The result may include that a flap is detected in the synchronization source within the first period or no flap is detected in the synchronization source within the first period. In this case, a synchronization source may be identified as instable if a flap is detected in the synchronization source within the first period. In contrast, a synchronization source may be identified as stable if no flap is detected in the synchronization source within the first period.

In an exemplary embodiment, if a synchronization source is identified as instable, it may still be detected continually. However, if the synchronization source is still instable after one or more detecting periods, e.g., after one or more first periods, the stability of the synchronization source might be considered worse. Moreover, the longer time is taken by a synchronization source to reach a stable state, the worse the stability of the synchronization source is. Since a frequency and/or number of occurrence of flap may be used to differentiate different stabilities and thus determine an availability, detecting them is important and meaningful for determining an availability of a synchronization source based on a stability of a synchronization source. Therefore, identifying the synchronization source as instable may further comprise setting a penalty value and a count for a flap detected in the synchronization source. In this case, the penalty value may be considered a figure-of the merit of stability, which helps to indicate a degree of a stability of a synchronization source. In this way, a better source can be selected from many sources by means of the penalty value even if those sources are all identified as instable.

In view of the above, therefore, method 300 may comprise increasing the penalty value and the count once a flap is detected, which means that a stability of synchronization source is getting worse. The larger penalty value and count may means that a stability of a synchronization source is worse. The penalty value and the count may be configurable or adjustable to indicate a degree of a stability of a synchronization source as demand. In some embodiments, initial values of the penalty value and the count may be configured to be zero. In some embodiments, method 300 may further comprise configuring a maximum value of the penalty value such that the penalty value does not continue to increase when the penalty value reaches the maximum value. The reasons why a maximum value of the penalty value is configured in that if a synchronization source is very instable during detection and thus the penalty value might be increased to an extreme large value so that the synchronization source can become no longer a candidate, it is undesired. Thus, configuring the maximum value of the penalty value can avoid a loss of a synchronization source. In some embodiments, the penalty value may be based on the count. That is, the penalty value may be associated with the count and the penalty value may be calculated based on count to become a function of the count.

Although increasing the penalty value and count means a worse stability of a synchronization source, the stability of the synchronization source with the penalty value and count might change over time, e.g., a flap occurs more frequently, infrequently or hardly over time. Therefore, a chance is required to be provided to further indicate a stability of the synchronization source. In this case, method 300 may comprise starting a second period to further detect within the second period whether there is another failure in the synchronization source. Similar to the first period, the second period also may be configurable or adjustable.

If another failure is detected in a synchronization source within the second period, method 300 may restart the first period when the synchronization source recovers from the another failure. That is, in the case that the synchronization source recovers from a failure again and thus might become a candidate, the stability of the synchronization source is required to be detected continually. The acts that need to be performed within the first period are already described above and thus they are not described again in detail herein.

If no another failure is detected in the synchronization source within the second period, which at least means that the synchronization source might be stable within the second period, then the penalty value will be decreased to indicate that the stability of the synchronization source is getting better. In some embodiments, if a synchronization source might be required to be a candidate as fast as possible, then decreasing the penalty value may comprise decreasing penalty value faster than increasing the penalty value. In an exemplary embodiment, decreasing penalty value faster than increasing the penalty value may comprise decreasing the penalty value exponentially. It will be appreciated by those skilled in the art that decreasing the penalty value as fast as possible or faster than increasing the penalty value can be achieved by any suitable manner and thus is not limited to only decreasing the penalty value exponentially.

It can be determined based on the above that the smaller penalty value means better stability of a synchronization source. When the penalty value is small enough, it may be considered available. Therefore, in an exemplary embodiment, a threshold may be set. In this way, a decreased penalty value may be compared with the threshold to determine that the decreased penalty value is small enough to cause a synchronization source to be considered available. Similar to the first period, second period, penalty value, and count, the threshold also may be configurable or adjustable.

Therefore, in an exemplary embodiment, method 300 may comprise comparing decreased penalty value with a threshold. If the decreased penalty value is larger than or equal to the threshold, which means that penalty value is not small enough and thus the synchronization source is still instable, the synchronization source thus may be identified as instable. In the case, method 300 may comprise restarting the second period to monitor the synchronization source within second period as described above. If the decreased penalty value is less than the threshold, which means that the penalty value is already small enough and thus the synchronization source is stable, the synchronization source may be identified as stable.

After a stability of a synchronization source is detected and identified, the availability of the synchronization source may be determined accordingly. Therefore, in an exemplary embodiment, in method 300, determining the availability of the synchronization source based on the detected stability of the synchronization source may further comprise determining the synchronization source as available if the synchronization source is identified as stable; or determining the synchronization source as unavailable if the synchronization source is identified as instable.

In most cases, there are typically many synchronization sources. However, if all of synchronization sources fail and thus are identified as instable, components or devices cannot select any synchronization source as a reference, it is undesired. In this case, thus, in some embodiments of method 300, determining the availability of a synchronization source based on the detected stability of the synchronization source may further comprise determining the synchronization source as available even if the synchronization source is identified as instable in the case that the synchronization source is used originally and/or the penalty value of the synchronization source is the smallest among all synchronization sources if all synchronization sources are identified as instable. That is, even if all of synchronization sources fail and thus instable, one synchronization source should be selected as a reference. In this case, a synchronization source that is used originally may be considered available or a synchronization source whose penalty value is the smallest among all synchronization sources may be considered available. In this way, one synchronization source may be always selected as a reference in any case for components or devices.

However, since the synchronization source that is selected as a reference in the above case is actually unqualified, it is necessary that this is prompted, e.g. notifying an operator of this. Therefore, in some embodiments, method 300 may further comprise generating an alarm if the synchronization source is determined as available when it is actually unqualified. To this end, method 300 can be performed independently for each synchronization source.

It will be appreciated that method 300 described above with respect to FIG. 3 may be applied in any suitable devices or components in any suitable communication system to achieve any synchronization, e.g., frequency synchronization, phase/time synchronization, frame synchronization, etc. In other words, the method based on the principle of the present disclosure may be applied to any devices, components, systems, networks, and/or the combination thereof that may receive synchronization sources and/or may provide synchronization sources, e.g., a router, a switch, etc.

Based on the above, it can be seen that the method of the present disclosure possesses many advantages over the manner of the WTR, e.g., the method of the present disclosure may determine an availability of a synchronization source in a more flexible manner than the WTR.

Figure 4:
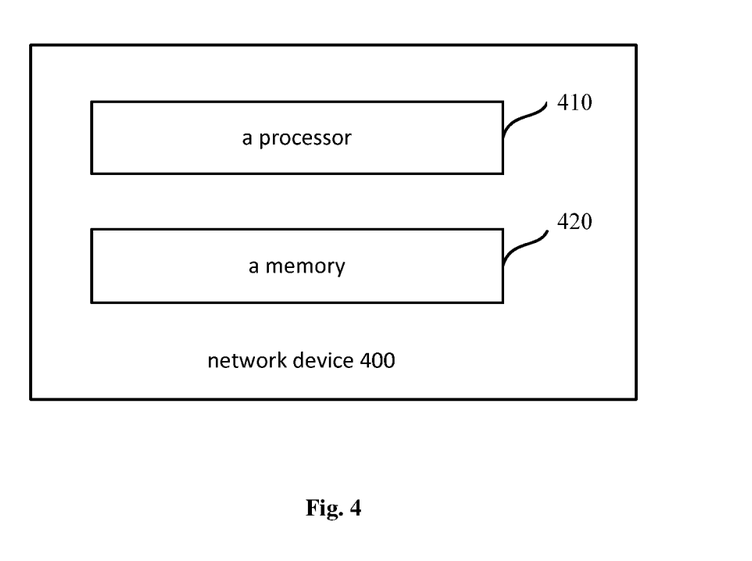
FIG. 4 is a block diagram of a network device for determining an availability of a synchronization source in a communication system according to an embodiment of the present disclosure.

FIG. 4 is a block diagram of a network device 400 for determining an availability of a synchronization source in a communication system according to an embodiment of the present disclosure. As shown in FIG. 4, network device 400 may comprise a processor 410 and a memory 420. The memory 420 may be communicatively coupled to the processor and adapted to store instructions which, when executed by the processor 410, cause network device 400 to perform operations of detecting a stability of the synchronization source when the synchronization source recovers from a failure; and determining the availability of a synchronization source based on the detected stability of the synchronization source. The instructions stored in the memory 420 also may include those that, when executed by the processor 410, cause network device 400 to implement other steps of the methods described with respect to FIG. 3 in addition those steps described above with respect to FIG. 4. It will be appreciated that network device 400 may include any other suitable components and may be implemented by any suitable technology.

The processor 410 may include one or more processing units. A processing unit may be a physical device or article of manufacture comprising one or more integrated circuits that read data and instructions from computer readable media, such as the memory 420, and selectively execute the instructions. In various embodiments, the processor 410 may be implemented in various ways. As an example, the processor 410 may be implemented as one or more processing cores. As another example, the processor 410 may comprise one or more separate microprocessors. In yet another example, the processor 410 may comprise an application-specific integrated circuit (ASIC) that provides specific functionality. In yet another example, the processor 410 provides specific functionality by using an ASIC and by executing computer-executable instructions.

The memory 420 may include one or more computer-usable or computer-readable storage medium capable of storing data and/or computer-executable instructions. It should be appreciated that the storage medium is preferably a non-transitory storage medium.

It will be appreciated that network device 400 may comprise any other suitable component.

Figure 5:
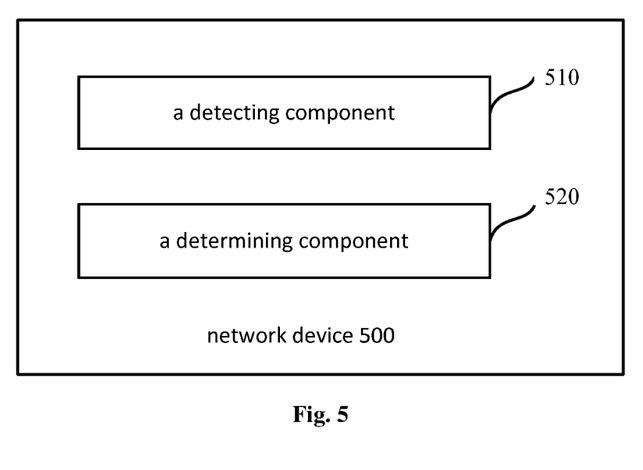
FIG. 5 is a block diagram of another network device for determining an availability of a synchronization source in a communication system according to an embodiment of the present disclosure.

FIG. 5 is a block diagram of another network device 500 for determining an availability of a synchronization source in a communication system according to an embodiment of the present disclosure. As shown in FIG. 5, network device 500 may comprise a detecting component 510 and a determining component 520. The detecting component 510 may be operable to detect a stability of the synchronization source when the synchronization source recovers from a failure. The determining component 520 may be operable to determine the availability of a synchronization source based on the detected stability of the synchronization source. It will be appreciated that network device 500 also may include any other suitable component(s) that is/are operable to perform other steps of the method described with respect to FIG. 3 in addition those steps described above with respect to FIG. 5.

In some embodiments, network device 500 also may include other components that are operable to perform steps as described below. In an embodiment, the detecting the stability of the synchronization source when the synchronization source recovers from the failure may comprise: starting a first period when the synchronization source recovers from the failure; detecting within the first period whether there is the flap occurred in the synchronization source; identifying the synchronization source as instable if the flap is detected in the synchronization source; or identifying the synchronization source as stable if no flap is detected in the synchronization source. In an embodiment, identifying the synchronization source as instable may further comprise setting a penalty value and a count for the flap detected in the synchronization source; increasing the penalty value and the count; starting a second period; detecting within the second period whether there is another failure in the synchronization source; restarting the first period when the synchronization source recovers from the another failure if the another failure is detected in the synchronization source; or decrease the penalty value if no another failure is detected in the synchronization source; comparing decreased penalty value with a threshold; if the decreased penalty value is larger than or equal to the threshold: identifying the synchronization source as instable; restarting the second period; or if the decreased penalty value is less than the threshold: identifying the synchronization source as stable. In an embodiment, determining the availability of the synchronization source based on the detected stability of the synchronization source may further comprise: determining the synchronization source as available if the synchronization source is identified as stable; or determining the synchronization source as unavailable if the synchronization source is identified as instable. In an embodiment, determining the availability of a synchronization source based on the detected stability of the synchronization source may further comprise: determining the synchronization source as available even if the synchronization source is identified as instable in the case that the synchronization source is used originally and/or the penalty value of the synchronization source is the smallest among all synchronization sources if all synchronization sources are identified as instable. In an embodiment, an alarm may be generated when the synchronization source is determined as available. In an embodiment, the penalty value, the count, the threshold, the first period, and the second period may be configurable. In an embodiment, initial values of the penalty value and the count may be configured to be zero. In an embodiment, a maximum value of the penalty value may be configured such that the penalty value does not continue to increase when the penalty value reaches the maximum value. In an embodiment, the penalty value may be based on the count. In an embodiment, decreasing the penalty value may comprise decreasing penalty value faster than increasing the penalty value. In an embodiment, decreasing penalty value faster than increasing the penalty value may comprise decreasing the penalty value exponentially.

Figure 6:
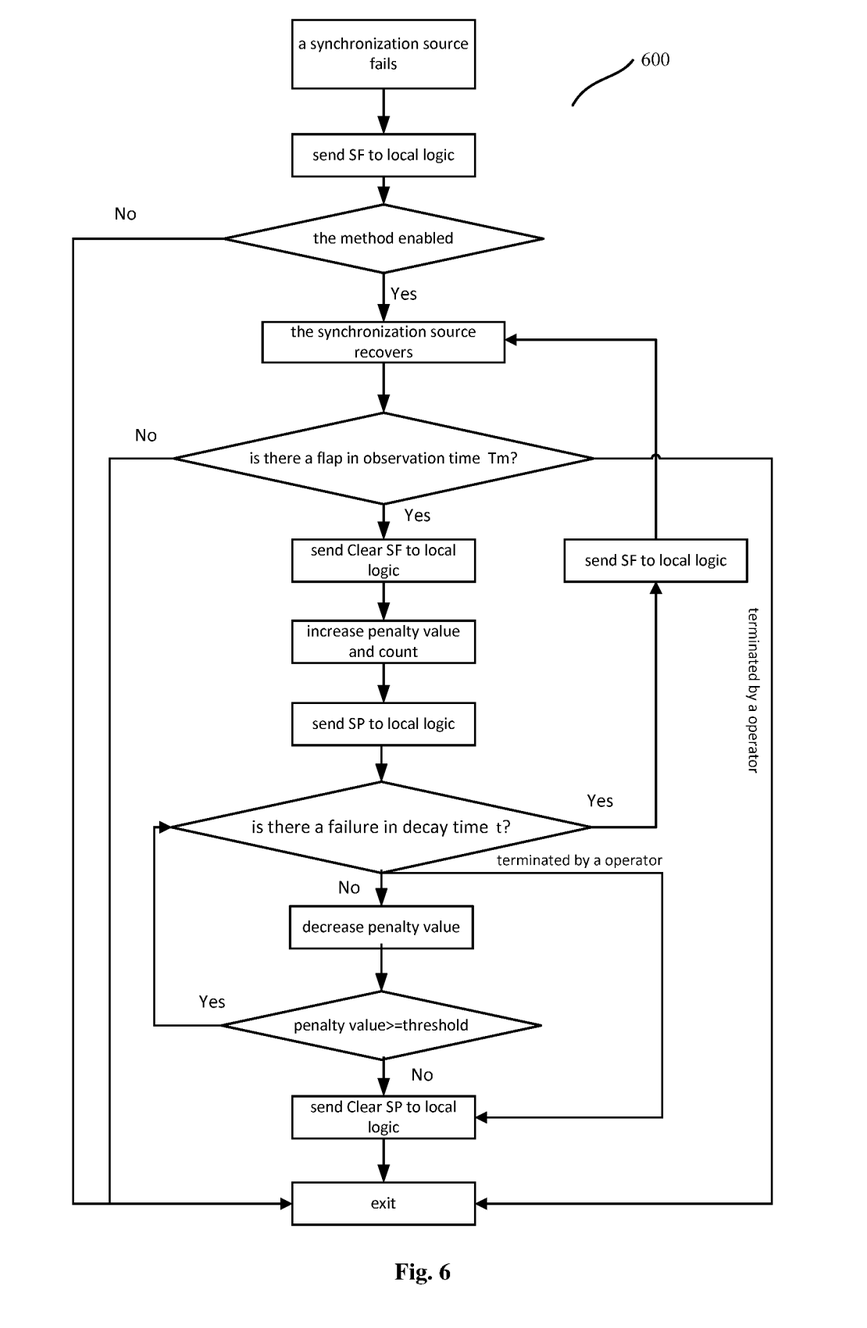
FIG. 6 is a flowchart schematically illustrating a process for determining an availability of a synchronization source in a communication system according to an embodiment of the present disclosure.

FIG. 6 is a flowchart schematically illustrating a process 600 for determining an availability of a synchronization source in a communication system according to an embodiment of the present disclosure. Process 600 is a process that can be applied to an existing communication system based on the principle of the present disclosure. In an existing communication system, there is typically a local logic that is responsible for determining an availability of a synchronization source by using the WTR. The local logic may be used to implement process 600 based on the principle of the present disclosure. To implement process 600 in the local logic, some new events and new alarms for delivering message to the local logic or a human operator are defined. However, it will be appreciated that process 600 may be implemented in any other suitable logic, device, system, etc., in any form of hardware, software, firmware, and any combination thereof.

As shown in FIG. 6, process 600 may start with a failure of a synchronization source. When the synchronization source fails, an indication of Signal Fail (SF) may be sent to the local logic to inform the local logic of the failure of the synchronization source. The indication of SF also may trigger an alarm for notify a human operator of failure of the synchronization source.

After the sending of an indication of SF, in process 600, it may be decided whether the method of the present disclosure for determining an availability of a synchronization source or the method using the WTR is enabled. If the method using the WTR is enabled, the logic may exit from process 600 and may use the method of the WTR to determine an availability of a synchronization (not shown). If the method of the present disclosure for determining the availability of the synchronization source is enabled, process 600 will proceed to a recovery of the failing synchronization source.

In process 600, an observation period Tm may be started when the synchronization source recovers from the failure to detect within the observation period whether there is flap occurred in the synchronization source. The observation period is equivalent to the first period described above with respect to method 300 of FIG. 3.

The observation period may be configurable and may be implemented by a timer. It will be appreciated that the observation period may be implemented by any suitable technology.

If there is no flap detected within the observation period or the observation period is terminated as demand by an operator, process 600 may exit, which means that the local logic considers the synchronization source stable and thus available. If flap is detected within the observation period, an indication of Clear Signal Fail (Clear SF) may be sent to the local logic to indicate the synchronization source has recovered. The indication of Clear SF also may clear the alarm triggered by the indication of SF to notify a human operator of the recovery of the synchronization source.

After sending the indication of Clear SF, in process 600, a penalty value and a count for the flap may be increased. That is, the stability of the synchronization source may be determined by means of the penalty value and the number of the flap may be recorded.

The penalty value and the count may be configurable and initial values of the penalty value and the count may be configured to be zero. The penalty value and the count may be increased by equations below, respectively:

$$\text{the penalty value} = \min\{2^N * 1000, X\{1-(\tfrac{1}{2})^{[(t1-t0)/T]}\} + \text{delta}\}; \quad (1)$$

$$\text{the count} = \min\{n+1, N\}; \quad (2)$$

wherein X indicates the magnitude of penalty value over time;

N is defined as the maximum value of the count, which is used to avoid a synchronization source stays in Source Penalty (SP) state, as described below, for an unpredictable long time; the max penalty value can be defined accordingly based on N, for example, $1000*2^N$;

t1 is current system time;

t0 is the system time when a decay time t as described below is started; and the delta may be set and may be equal to $1000*2^{(n-1)}$ considering the existing system.

After increasing the penalty value and the count or at the same time, an event (Source Penalty) defined newly occurs and an indication of Source Penalty (SP) may be sent to the logic to indicate that although the synchronization source has recovered from a failure but the synchronization source is still instable because flap is detected.

In this case, in process 600, the decay time t may be started, which is equivalent to starting the second period described above with respect to method 300 of FIG. 3, to detect within the decay time whether there is another failure in the synchronization source. The purpose of setting the decay time is that if the synchronization source does not fail again within the decay time, the penalty value that represents its stability will be decayed so that the synchronization source might be a candidate again when the penalty value is decayed to certain extent.

The decay time may be also configurable and may be implemented by a timer. It will be appreciated that the decay time may be implemented by any suitable technology. The decay time also can be terminated as demand by an operator. When the decay time is terminated by the operator, an event (Clear SP) defined newly occurs and an indication of Clear SP may be sent to the logic to indicate the synchronization source is stable and thus available (not shown), and then process 600 may exit. At the same time, the indication of Clear SP may clear the alarm triggered by the indication of SP to notify a human operator of an available synchronization source.

If another failure is detected within the decay time, in process 600, the steps described above may be repeated to handle the failure. That is, in process 600, an indication of SF may be sent to the logic again and an alarm may be triggered, a recovery of the failing synchronization source may be waited for, the observation time may be restarted again, and the subsequent steps as described above may be performed. If no another failure is detected in the decay time, in process 600, the penalty value may be decreased. In an embodiment, the penalty value may be decreased, i.e. a decay of the penalty value, in a manner that decreasing is faster than increasing. In another embodiment, the penalty value may be decreased in a manner that decreasing is much faster than increasing, e.g. exponentially by an equation (3) below:

the penalty value=$X[1-(½)^{(t/T)}]$;  (3)

wherein T is half decay life that is used to indicate a speed of exponentially decreasing, e.g. five minutes.

Then, in process 600, the decreased penalty value that is calculated by, for example, the above equation (3) may be compared with a threshold that is configurable.

If decreased penalty value is larger than or equal to the threshold, in process 600, the decay time may be restarted to detect whether there is another failure in the synchronization source. If there is no another failure in the synchronization source, the penalty value will be decreased continuously. If there is another failure, process 600 may proceed as described above.

If the decreased penalty value is less than the threshold, the synchronization source may be considered stable and available, and in process 600, an indication of Clear SP may be sent to the logic to indicate the synchronization source is stable and thus available, and process 600 then may exit. At the same time, the indication of Clear SP may clear the alarm triggered by the indication of SP to notify a human operator of the available synchronization source.

In addition, process 600 may further comprise additional steps (not shown) for handling the case that all of provided synchronization sources are considered instable. In the case that all of provided synchronization sources are considered instable and thus are unavailable, i.e., all synchronization sources are in SP state, there may be three options to handle this case: (1) determining the synchronization source that is used originally as available; (2) determining the synchronization source as available whose penalty value is the smallest among all synchronization sources; and (3) switching into holdover.

It will be appreciated that the order described above in which process 600 is performed is merely exemplary and those steps performed in succession also may be performed simultaneously.

It can be seen that process 600 not only possesses advantages mentioned above but also may be used in conjunction with an existing logic, which will minimize the cost of deploying the method of the present disclosure.

It will be appreciated that the method and process described above may be implemented by a non-transitory computer readable medium having a computer program stored thereon, by a hardware, software, firmware, and/or any combination of thereof.

The present disclosure may also provide a memory containing the computer program as mentioned above, which includes machine-readable media and machine-readable transmission media. The machine-readable media may also be called computer-readable media, and may include machine-readable storage media, for example, magnetic disks, magnetic tape, optical disks, phase change memory, or an electronic memory terminal device like a random access memory (RAM), read only memory (ROM), flash memory devices, CD-ROM, DVD, Blue-ray disc and the like. The machine-readable transmission media may also be called a carrier, and may include, for example, electrical, optical, radio, acoustical or other form of propagated signals, such as carrier waves, infrared signals, and the like.

The techniques described herein may be implemented by various means so that an apparatus implementing one or more functions of a corresponding apparatus described with an embodiment includes not only prior art means, but also means for implementing the one or more functions of the corresponding apparatus described with the embodiment and it may include separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Example embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including hardware, software, firmware, and a combination thereof. For example, in one embodiment, each block of the block diagrams and flowchart illustrations, and combinations of blocks in the block diagrams and flowchart illustrations can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

The invention claimed is:

1. A method for determining an availability of a synchronization source in a communication system, comprises:
    detecting a stability of the synchronization source when the synchronization source recovers from a failure; and determining the availability of a synchronization source based on the detected stability of the synchronization source,
wherein the detecting the stability of the synchronization source when the synchronization source recovers from the failure comprises:
starting a first period when the synchronization source recovers from the failure;
detecting within the first period whether there is a flap occurred in the synchronization source;
when the flap is detected in the synchronization source, identifying the synchronization source as instable;
when no flap is detected in the synchronization source, identifying the synchronization source as stable; and
wherein identifying the synchronization source as instable further comprises:
setting a penalty value and a count for the flap detected in the synchronization source;
increasing the penalty value and the count;
starting a second period;
detecting within the second period whether there is another failure in the synchronization source;
restarting the first period when the synchronization source recovers from the another failure if the another failure is detected in the synchronization source; or
decreasing the penalty value if no another failure is detected in the synchronization source;
comparing decreased penalty value with a threshold;
if the decreased penalty value is larger than or equal to the threshold then identifying the synchronization source as instable and restarting the second period; or
if the decreased penalty value is less than the threshold then identifying the synchronization source as stable.

2. The method of claim 1, wherein determining the availability of the synchronization source based on the detected stability of the synchronization source further comprises:
determining the synchronization source as available if the synchronization source is identified as stable; or
determining the synchronization source as unavailable if the synchronization source is identified as instable.

3. The method of claim 1, wherein determining the availability of a synchronization source based on the detected stability of the synchronization source further comprises:
determining the synchronization source as available even if the synchronization source is identified as instable in the case that the synchronization source is used originally or the penalty value of the synchronization source is the smallest among all synchronization sources if all synchronization sources are identified as instable.

4. The method of claim 3, further comprises generating an alarm when the synchronization source is determined as available when it is actually unqualified.

5. The method of claim 1, wherein the penalty value, the count, the threshold, the first period, and the second period are configurable.

6. The method of claim 5, wherein initial values of the penalty value and the count are configured to be zero.

7. The method of claim 5, further comprises configuring a maximum value of the penalty value such that the penalty value does not continue to increase when the penalty value reaches the maximum value.

8. The method of claim 1, wherein the penalty value is based on the count.

9. The method of claim 1, wherein decreasing the penalty value comprises decreasing penalty value faster than increasing the penalty value.

10. The method of claim 9, wherein decreasing penalty value faster than increasing the penalty value comprises decreasing the penalty value exponentially.

11. A network device for determining an availability of a synchronization source in a communication system, comprises:
a processor; and
a memory communicatively coupled to the processor and adapted to store instructions which, when executed by the processor, cause the network device to perform operations of:
detecting a stability of the synchronization source when the synchronization source recovers from a failure; and
determining the availability of a synchronization source based on the detected stability of the synchronization source,
wherein the operation of detecting the stability of the synchronization source when the synchronization source recovers from a failure comprises operations of:
starting a first period when the synchronization source recovers from the failure;
detecting within the first period whether there is a flap occurred in the synchronization source;
when the flap is detected in the synchronization source, identifying the synchronization source as instable;
when no flap is detected in the synchronization source, identifying the synchronization source as stable; and
wherein the operation of identifying the synchronization source as instable further comprises operations of:
setting a penalty value and a count for the flap detected in the synchronization source;
increasing the penalty value and the count;
starting a second period;
detecting within the second period whether there is another failure in the synchronization source;
restarting the first period when the synchronization source recovers from the another failure if the another failure is detected in the synchronization source; or
decreasing the penalty value if no another failure is detected in the synchronization source;
comparing decreased penalty value with a threshold;
if the decreased penalty value is larger than or equal to the threshold then identifying the synchronization source as instable and restarting the second period; or
if the decreased penalty value is less than the threshold then identifying the synchronization source as stable.

12. The network device of claim 11, wherein the operation of determining the availability of the synchronization source based on the detected stability of the synchronization source further comprises operations of:
determining the synchronization source as available if the synchronization source is identified as stable; or
determining the synchronization source as unavailable if the synchronization source is identified as instable.

13. The network device of claim 11, wherein the operation of determining the availability of a synchronization source based on the detected stability of the synchronization source further comprises operations of:
determining the synchronization source as available even if the synchronization source is identified as instable in the case that the synchronization source is used originally or the penalty value of the synchronization source is the smallest among all synchronization sources if all synchronization sources are identified as instable.

14. The network device of claim 13, further comprises an operation of generating an alarm when the synchronization source is determined as available when it is actually unqualified.

15. The network device of claim 11, wherein the penalty value, the count, the threshold, the first period, and the second period are configurable.

16. The network device of claim 15, further comprises an operation of configuring a maximum value of the penalty value such that the penalty value does not continue to increase when the penalty value reaches the maximum value.

* * * * *